Figure 2:
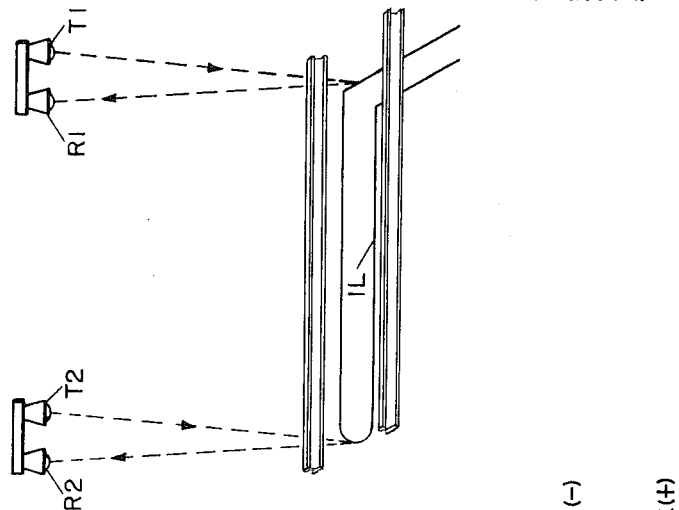

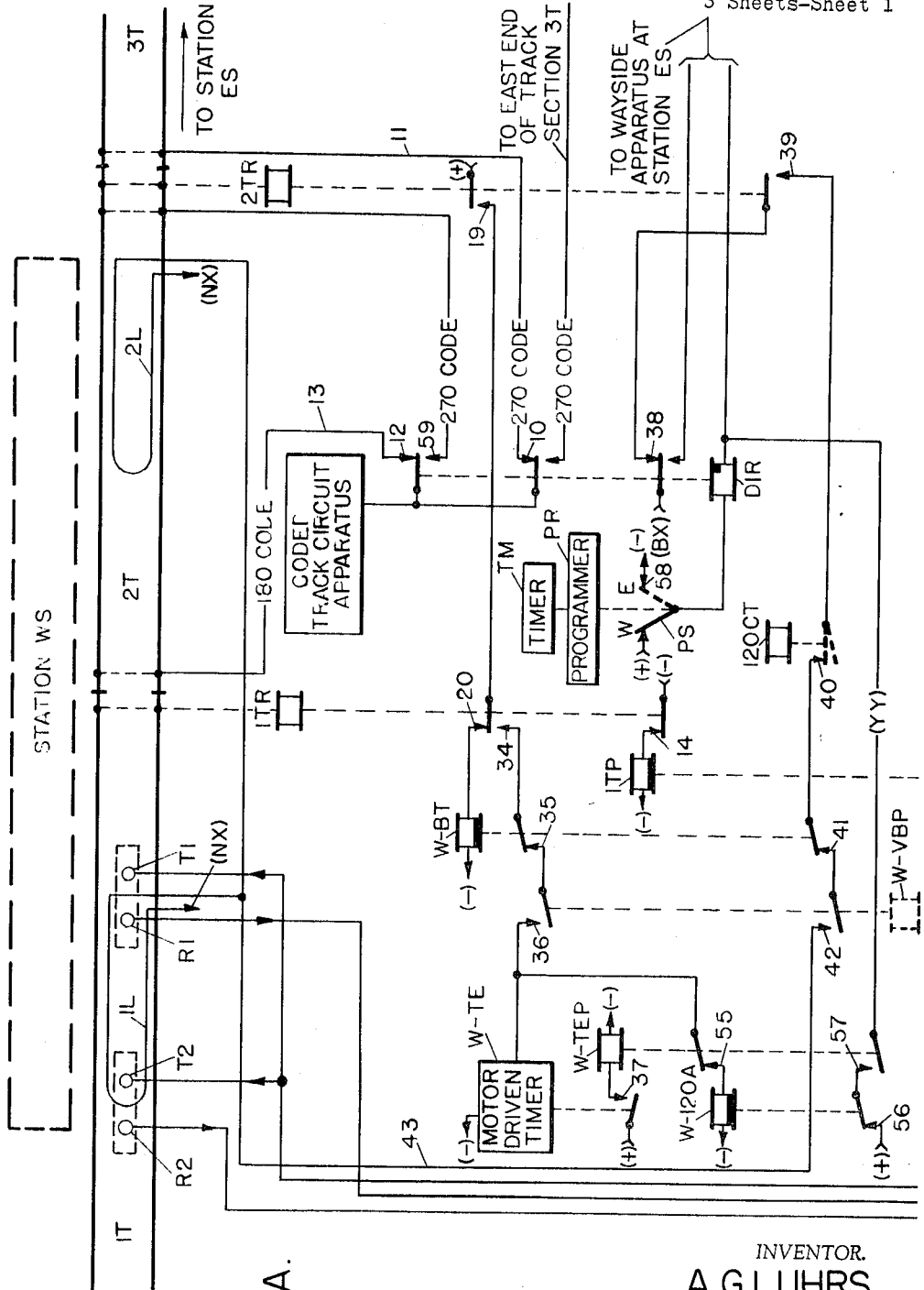
FIG. IA.

May 17, 1966  A. G. LUHRS  3,251,990
VEHICLE DETECTION AND CONTROL SYSTEM
Filed Dec. 28, 1961  3 Sheets-Sheet 2

INVENTOR.
A.G.LUHRS
BY
HIS ATTORNEY

May 17, 1966  A. G. LUHRS  3,251,990
VEHICLE DETECTION AND CONTROL SYSTEM
Filed Dec. 28, 1961  3 Sheets-Sheet 3

INVENTOR.
A.G. LUHRS
BY
HIS ATTORNEY

United States Patent Office 3,251,990
Patented May 17, 1966

3,251,990
VEHICLE DETECTION AND CONTROL SYSTEM
Arthur G. Luhrs, Spencerport, N.Y., assignor to
General Signal Corporation
Filed Dec. 28, 1961, Ser. No. 162,641
10 Claims. (Cl. 246—167)

This invention generally relates to vehicle detection and control systems and more particularly pertains to a system for controlling a vehicle dependent upon the actual stopping position of the vehicle relative to a predetermined desired stopping location.

There are many instances where it is desirable that a vehicle, such as a railway train, be properly spotted with respect to a predetermined right of way stopping location before subsequent vehicle control operations be performed. For example, it has previously been proposed to automatically operate an unmanned shuttle subway train, between subway stations, in accordance with coded information communicated to the train from the wayside. In such a system, the motor and brake mechanisms of the vehicle are automaically operated in accordance with coded information applied to the track rails connecting the subway stations, while additional train carried operations are automatically performed in accordance with additional coded information communicated to the vehicle by wayside apparatus located at the various subway stations. More specifically, the doors on the subway train have been automatically operated, and, the train automatically conditioned for the opposite direction of travel, in accordance with coded information communicated from the wayside to the vehicle via fixed wayside loop circuits after the vehicle has arrived at one of the subway stations. However, in order to insure that the subway train stops properly over wayside loop circuits before the loop circuits are energized with this coded information, and to prevent faulty operation of the system upon failure of the vehicle to berth properly, the need exists for apparatus which will register the stopping position of a vehicle relative to a predetermined desired stopping location, i.e., over the wayside loop circuits.

In view of the above, it is generally proposed in accordance with the present invention to provide for detecting the actual stopping position of a vehicle, relative to a predetermined desired stopping location and to render subsequent control of the vehicle dependent upon this detection of the vehicle stopping position.

More specifically, in accordance with the illustrated embodiment of the present invention, means are provided at the respective limits of a predetermined desired stopping location which act to detect whether or not the vehicle has properly stopped within the predetermined limits before further automatic control of the vehicle occurs. For example, in this illustrated embodiment, an automatic subway train is properly spotted, at a wayside station, if it is stopped over a wayside loop circuit positioned at the predetermined desired stopping location. Energy transceiving means are then disposed on the wayside, at the respective ends of the loop circuit, for transmitting energy across the path of the vehicle and for detecting whether this transmitting energy is being reflected due to the presence of the vehicle at the predetermined desired stopping location. In the illustrated embodiment, this detection apparatus then dictates whether or not a door operating code will be communicated to the vehicle, via the loop circuit, for automatically operating the doors of the unmanned subway train.

In view of the above, one object of the present invention is to provide for controlling the operation of a vehicle dependent upon the detected stopping position of the vehicle relative to a predetermined desired stopping location.

A further object of the present invention is to provide for detecting both the proper stopping of a vehicle within a predetermined desired stopping location and also if the vehicel overruns or stops short of the desired stopping location.

A still further object of the present invention is to provide a wayside indication of whether or not a vehicle is detected as having properly stopped within a predetermined desired stopping location, in addition to controlling the vehicle dependent upon this detected stoppng position of the vehicle.

Other objects, purposes and characteristic features of the present invention will be in part obvious from the accompanying drawings and in part pointed out as the description of the present invention progresses.

Figure 1B:
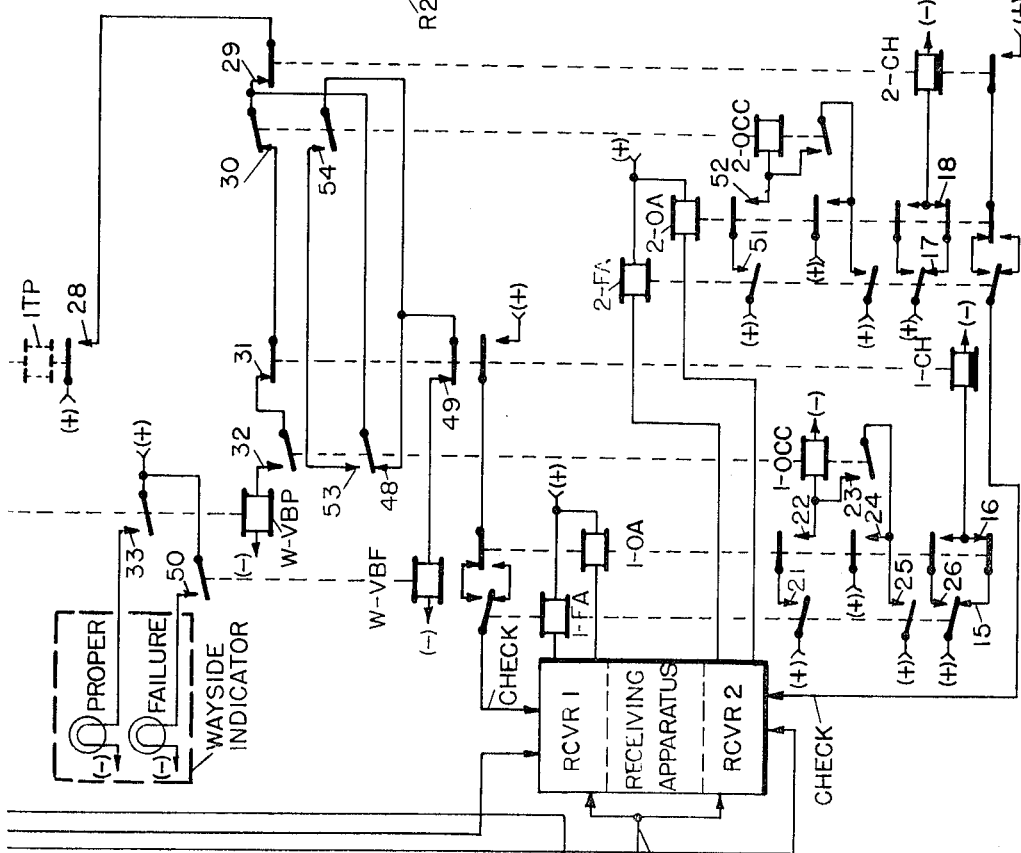
Figure 3:
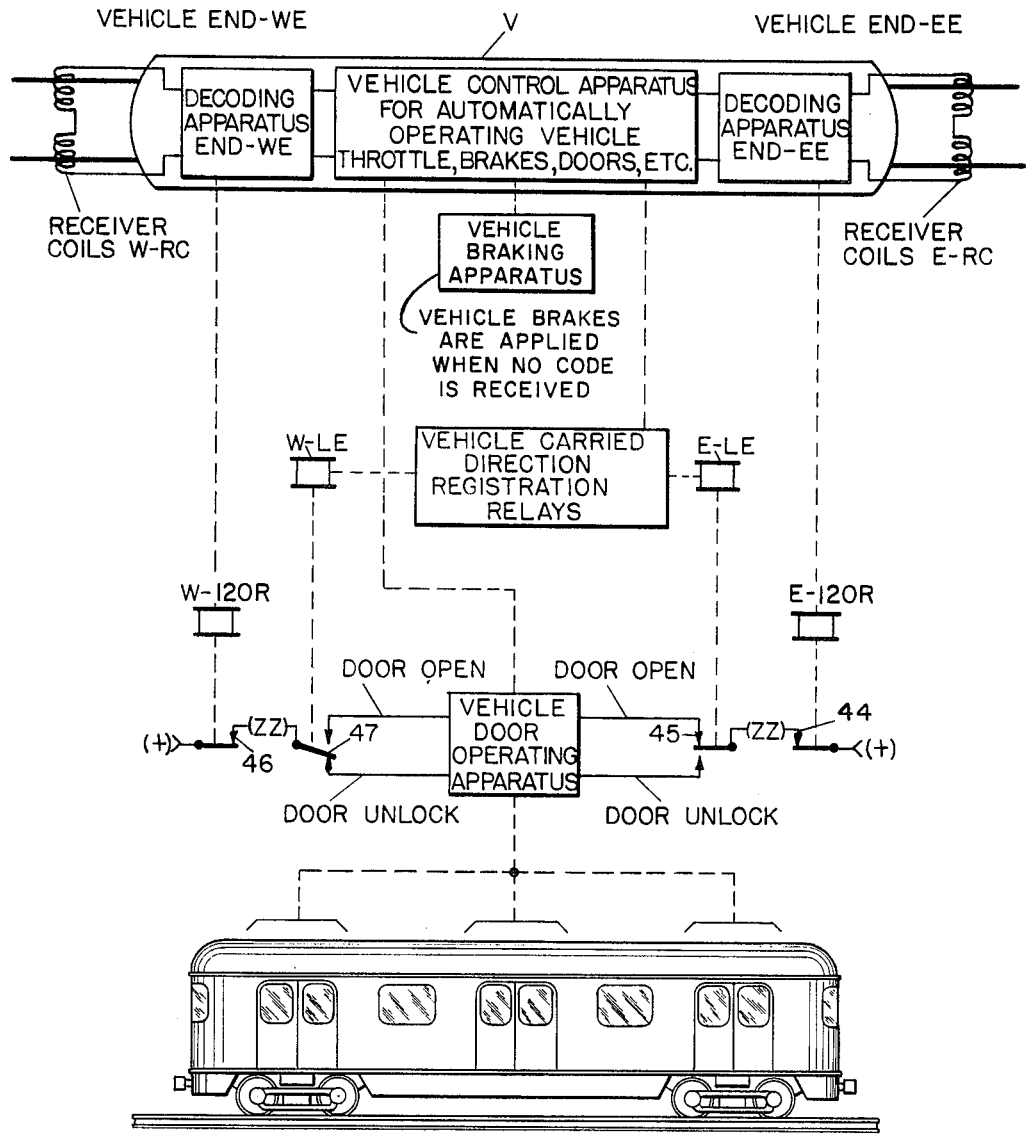

In describing the invention in detail, reference will be made to the accompanying drawings in which:

FIGS. 1A and 1B, when placed one above the other with FIG. 1A on top, illustrate the wayside apparatus employed in one embodiment of the present invention for communicating vehicle control information to a vehicle dependent upon whether or not the vehicle is properly stopped at a predetermined desired stopping location and including energy transceiver means disposed at either end of the predetermined desired stopping location for detecting if the vehicle is properly spotted;

FIG. 2 illustrates the relative positioning of such transceiver means when disposed overhead to detect the stopping position of a vehicle relative to the predetermined stopping location; and FIG. 3 illustrates certain vehicle carried apparatus employed in the embodiment shown, for operating the doors of an unmanned railway vehicle.

In order to simplify the illustration of the drawings and facilitate in the explanation of the fundamental characteristics of the invention, various parts and circuits have been shown diagrammatically in accordance with conventional symbols. Thus, arrows with associated symbols (+) and (—) are employed to indicate connections of the various relay circuits to opposite terminals of a suitable source of current for energization of such relays.

Referring now to FIG. 1A, a partial stretch of track is illustrated comprising track sections 1T, 2T and 3T adjacent a terminal station WS which is intended, for the specific embodiment shown herein, to be a subway station where passengers are loaded and unloaded aboard the automatic vehicle V, of FIG. 3, during shuttle operation of the vehicle between station WS and another station ES (not shown) which is assumed to be located east, or to the right, of station WS, as viewed in FIG. 1A.

In the illustrated embodiment, the desired direction of travel of the automated subway vehicle V is controlled by a programmer PR preset in accordance with the predetermined time schedule for the vehicle, for example, and receiving indication of the actual time from a wayside timer TM. This programmer PR is utilized to selectively operate the illustrated wayside direction registration relay DIR, in accordance with the desired direction of travel of the automated vehicle V. More specifically, the direction registration relay DIR registers the desired traffic direction and controls the illustrated wayside apparatus accordingly. For example, the operating condition of relay DIR determines the direction of transmission of the various speed control track codes utilized in this embodiment. These track codes are developed by the Coded Track Circuit Apparatus, illustrated in FIG. 1A, for automatically operating the vehicle V at the desired speed over the stretch track dependent upon the particular code rates supplied to the track rails of the various track sections. More specifically, it is intended here that a 270 code rate automatically operates the vehicle V at its high speed of thirty miles-per-hour, for example, whereas a 180 track code rate is intended here to call for a certain slowing down of the vehicle to a more restrictive speed such as, for example, five miles-per-hour preparatory to the arrival of the vehicle at a termination station. Furthermore, a "no code" condition existing on any track section is intended here to call for a complete stop of the vehicle on that track section. The details of suitable wayside track code applying circuitry and automation control apparatus aboard the vehicle, of the types assumed in accordance with the illustrative embodiment of the present invention, are disclosed in the co-pending application of Simon Reich, Ser. No. 114,748, filed June 5, 1961 and having a common assignee with the present application.

Located at the terminal station WS are wayside loop circuits 1L and 2L, disposed wtihin track sections 1T and 2T respectively, for communicating a 120 code rate to the respective ends of the vehicle V, where this 120 code rate is picked up by receiver coils W–RC and E–RC, of FIG. 3, for causing the Vehicle Door Operating Apparatus to automatically operate the vehicle doors to permit loading and unloading of passengers aboard the vehicle. It will be noted in FIG. 3 that the reception of this 120 code rate at one end of the vehicle unlocks the vehicle doors while the concurrent reception of the 120 code rate at the opposite end of the vehicle is necessary before the vehicle doors will be opened. Thus, in the selected embodiment of the present invention shown herein, the desired stopping location of the vehicle V, at station WS, is with vehicle end WE positioned over wayside loop circuit 1L and vehicle end EE positioned over wayside loop circuit 2L.

In order to detect that the vehicle V has properly stopped at station WS, with end WE located on loop circuit 1L and end EE located on loop circuit 2L, before the door control code can be applied to the wayside loop circuits 1L and 2L, energy transceiver units are disposed at opposite ends of the wayside loop circuit 1L for checking the stopping position of the vehicle V relative to the predetermined desired stopping location. Referring now to the accompanying drawings, the detecting organization includes Transmitting Apparatus of FIG. 1B which supplies pulses of energy of a distinct frequency (for example, twenty kilocycles per second) to the transmitting units T1 and T2 of FIG. 1A (located at the right and left-hand end respectively of loop 1L) which in turn transmit these pulses of energy across the path of the vehicle V at the respective ends of the wayside loop circuit 1L (see FIG. 2). Associated with the transmitting units T1 and T2 are receiving units R1 and R2 respectively which receive the transmitted pulses of energy when such pulses are reflected from the floor of the right of way, or from the vehicle V when it is standing over wayside loop circuit 1L.

The pulses of energy received by the receiving units R1 and R2 are then applied as inputs to receivers RCVR1 and RCVR2 respectively, shown in FIG. 1B, which interpret these inputs and selectively energize associated relays 1–FA, 1–OA, 2–FA and 2–OA dependent upon whether or not the energy received by the respective receiving units R1 and R2 has been reflected from the floor of the right of way or from an intervening vehicle. More specifically, the relays 1–OA and 2–OA are object absent relays which are picked up (relays 1–FA and 2–FA dropped away) when the receiving units R1 and R2 respectively are receiving energy reflected from the floor of the right of way, while relays 1–FA and 2–FA are floor absent relays which are picked up (relays 1–OA and 2–OA dropped away) when the energy received at the associated receiving units R1 and R2 has been reflected by an intervening vehicle. These relays 1–FA, 1–OA, 2–FA and 2–OA then control occupancy relays 1–OCC and 2–OCC which in turn control berthing relays W–VPB and W–VBF for registering whether or not the vehicle has berthed properly at the terminal station WS, with its respective ends WE and EE positioned over loop circuits 1L and 2L respectively, before the vehicle doors are operated. It should, of course, be understood that a similar detecting system would be provided for terminal station ES (not shown). In order to prevent faulty operation of the detecting apparatus, due to any reflections from people, animals, or the like, certain GATING PULSES are supplied by the Transmitting Apparatus to the receivers RCVR1 and RCVR2 to render these receivers insensitive to such extraneous reflections.

From the above, it will be noted that the relays FA and OA, associated with a given receiver (RCVR1) for example) always are in dissimilar operating positions when the detecting apparatus is functioning properly; i.e., one relay picked up and the other dropped away. These relays 1–FA, 1–OA, 2–FA and 2–OA are then utilized to control associated checking relays 1–CH and 2–CH which check whether or not the detecting system is functioning properly by detecting if relays 1–FA and 1–OA, for example, remain in similar operating positions for an unduly long period of time.

A wayside indication is also provided by the Wayside Indicator, of FIG. 1B, to inform the dispatcher or other wayside personnel concerning the stopping position of the vehicle relative to the desired stopping location, so that all difficulties may be immediately remedied.

*Operation*

Before beginning the detailed description of the operation of the selected embodiment shown herein, it is desirable to first establish the normal operating conditions of the various circuit apparatus utilized herein.

In discussing the normal conditions of the system, it will be assumed that the programmer PR has previously operated programming switch PS to its left-hand or westbound position W and that the direction registration relay DIR has thus been selectively energized to assume its westbound traffic position wherein its front contacts are closed for supplying track codes to the left-hand or west end of the respective track circuits.

More specifically, with direction registration relay DIR picked up, a 270 code rate (calling for vehicle speed of thirty miles-per-hour) is applied to the left-hand end of track section 3T from the Coded Track Circuit Apparatus, of FIG. 1A, through front contact 10 of direction registration relay DIR and along wire 11, while a 180 track code rate (calling for speed reduction to five miles-per-hour) is applied to the left-hand end of track section 2T through front contact 12 of direction registration relay DIR and along wire 13. It should be pointed out at this time that direction registration relay DIR has been assumed to be of the magnetic stick type which closes its front or back contacts depending upon the polarity of energization to its winding and which remains in this operating position, even though deenergized, until the opposite polarity of energization is applied.

Assuming that track sections 1T and 2T are unoccupied, track relays 1TR and 2TR are each normally picked up by a conventional track battery (not shown). With track relay 1TR thus picked up, its repeater relay 1TP is also normally picked up by a circuit extending from (+), through front contact 14 of track relay 1TR, and to (—). This track repeater relay 1TP is made slow releasing for purposes to be described in detail hereinafter.

Since it has been assumed that there is no vehicle occupying the wayside loop circuit 1L, the pulses of energy being transmitted by transmitting units T1 and T2 are reflected from the floor of the right of way and are received by the associated receiving units R1 and R2. Object absent relays 1–OA and 2–OA, associated with receiving units R1 and R2 respectively, are then both picked are then both picked up, as previously discussed, while floor absent relays 1–FA and 2–FA are both released (see FIG. 1B). Check relays 1–CH and 2–CH are thus both energized; relay 1–CH by a circuit extending from (+), through back contact 15 of relay 1–FA, front contact 16 of relay 1–OA, and to (−), and relay 2–CH by a circuit including back contact 17 of relay 2–FA and front contact 18 of relay 2–OA. As mentioned previously, the checking relays 1–CH and 2–CH are provided to check that the detecting organization is functioning properly and, for example, would normally control suitable indicating means (not shown) provided for the detecting system. For simplicity it is assumed here that the energization of the CHECK wires, of FIG. 1B, will cause such suitable indicating means (not shown) to indicate malfunctioning of the detecting apparatus.

In order to explain the detailed operation of the illustrated embodiment of the present invention, it will now be assumed that an automatically operated vehicle V enters at the right-hand end of track section 2T, so as to drop track relay 2TR, and that reception, by receiver coils W–RC, of the 180 code rate now being applied to section 2T, automatically causes the vehicle V to reduce its speed to the preselected five miles-per-hour from an assumed speed of thirty miles-per-hour, to which the vehicle was controlled while occupying track section 3T. This dropping of track relay 2TR then causes relay W–BT to be energized by a circuit extending from (+), through back contact 19 of track relay 2TR, front contact 20 of track relay 1TR, and to (−).

When the vehicle V enters at the right-hand end of track section 1T, it causes track relay 1TR to drop and furthermore detects the "no code" condition of track section 1T, for initiating a complete stop of the unmanned vehicle. Referring to FIG. 1A, the dropping of track relay 1TR deenergizes its repeater relay 1TP and also the relay W–BT by the opening of front contacts 14 and 20 respectively. However, both these relays 1TP and W–BT are slow drop away to permit the vehicle V to come to a complete stop and to allow the detecting apparatus to detect whether or not the vehicle is properly spotted, before further control of the operation of the vehicle takes place.

*Vehicle stops at desired stopping location*

The operation of the system will now be discussed, assuming that the vehicle V stops at the desired location with its leading end WE positioned over wayside loop circuit 1L. When the vehicle arrives at the right-hand end of wayside loop circuit 1L, the pulses of energy being transmitted by transmitting unit T1 are reflected from the vehicle, instead of the floor of the right of way, and are received by receiving unit R1. This reflection of the energy pulses by the vehicle V then causes receiver RCVR1, of FIG. 1B, to drop the object absent relay 1–OA and pick up floor absent relay 1–FA, for registering the arrival of the vehicle V at the right-hand end of the wayside loop circuit 1L by the picking up of occupancy relay 1–OCC. More specifically, occupancy relay 1–OCC is energized by a circuit extending from (+), through front contact 21 of relay 1–FA, back contact 22 of relay 1–OA, and to (−). This occupancy relay 1–OCC is then stuck in its picked up position through its own front contact 23 and either back contact 24 or front contact 25 of relays 1–OA and 1–FA respectively, connected in multiple. Referring to FIG. 1B, it will be noted that the check relay 1–CH is maintained in its picked up position at this time through front contact 26 of relay 1–FA and back contact 27 of relay 1–OA.

Provided that the vehicle V stops before it reaches the left-hand end of wayside loop circuit 1L, the relays 2–OA and 2–FA will remain in their respective normal operation conditions; i.e., relay 2–OA picked up and relay 2–FA dropped away, so that occupancy relay 2–OCC will remain in its normal deenergized position. Under these conditions, the vehicle has been properly spotted at station WS. Furthermore, check relay 2–CH remains picked up over contacts 17 and 18 of relays 2–FA and 2–OA respectively.

When track repeater relay 1TP now drops away, relay W–VBP is energized, to register the proper berthing of the vehicle V, by a circuit extending from (+) in FIG. 1B, through back contact 28 of relay 1TP, front contact 29 of relay 2–CH, back contact 30 of relay 2–OCC, front contact 31 of relay 1–CH, front contact 31 of relay 1–CH, front contact 32 of relay 1–OCC, and to (−). This picking up of relay W–VBP then causes illumination of the PROPER indication lamp of the Wayside Indicator of FIG. 1B, through front contact 33 of relay W–VBP.

As mentioned previously, relay W–BT is also slow drop away in nature, and, assuming that its back contacts are now closed, the motor driven timer W–TE and relay W–120A are simultaneously energized through back contact 19 of track relay 2TR, back contact 34 of track relay 1TR, back contact 35 of relay W–BT, and through front contact 36 of relay W–VBP. The relay W–120A now picks up and motor driven timer W–TE begins its timing operation, at the end of which it will close the associated contact 37 for energizing repeater relay W–TEP.

The picking up of relay W–VBP furthermore completes the energizing circuit for applying a door control 120 code rate to the wayside loop circuits 1L and 2L, of FIG. 1A. More specifically, this 120 code rate energizing circuit extends from terminal (BX), of a suitable source of alternating current, through front or westbound contact 38 of direction registration relay DIR, back contact 39 of track relay 2TR, front contact 40 of code transmitter 120CT, back contact 41 of relay W–BT, front contact 42 of relay W–VBP, along wire 43, through the wayside loop circuits 1L and 2L, and to terminal (NX).

With the vehicle V thus standing with its ends WE and EE lying over wayside loop circuits 1L and 2L respectively, receiver coils W–RC and E–RC, of FIG. 3 will simultaneously receive this 120 code rate which is then decoded by the illustrated Decoding Apparatus associated with the respective ends of the vehicle V, to selectively energize the associated relays W-120R and E–120R, for opening the doors of the vehicle. More specifically, the reception of the 120 code rate on vehicle end EE picks up relay E–120R and thereby causes energization of the DOOR OPEN control wire, of FIG. 3, through front contact 44 of relay E–120R and front contact 45 of relay E–LE, while the reception of the 120 code rate on vehicle end WE selectively energizes the DOOR UNLOCK control wire through front contact 46 of relay W–120R and back contact 47 of relay W–LE. With both the DOOR UNLOCK and DOOR OPEN control wires selectively energized, as described above, the Vehicle Door Operating Apparatus, of FIG. 3, opens the illustrated doors of the vehicle V.

The relays W–LE and E–LE, connected in the door control circuitry, are assumed to be included in the vehicle carried Direction Registration Relays of FIG. 3, so that one end of the vehicle unlocks the doors while the other end opens the doors as described above, and, therefore, the apparatus at both ends of the vehicle is checked as properly operating before the doors are opened. For example, these relays W–LE and E–LE might be selectively energized, as illustrated in FIG. 3, to register which end of the vehicle is to lead from the wayside station at which the vehicle V is located, and thus, as illustrated, relay E–LE is picked up while relay W–LE is dropped away, since the vehicle end EE will be leading when the vehicle V departs from the wayside terminal station WS. Furthermore, the reference designation ZZ, of FIG. 3, is intended here to represent various other conditions, dictated in accordance with the requirements of practice, that would normally be met before the vehicle doors are opened.

*Vehicle stops short of desired stopping location*

In the above it was assumed that the vehicle V made a proper stop with its leading end WE standing over the wayside loop circuit 1L and its trailing end EE over the wayside loop circuit 2L, so that both ends of the vehicle could simultaneously receive the 120 door control code rate. However, to further explain the operation of the selected embodiment, it will now be assumed that, because improper operation of the vehicle carried apparatus, the vehicle V comes to an abrupt stop upon entering track section 1T and thus fails to arrive at the right-hand end of the wayside loop circuit 1L. Under this condition, there will be no change from the illustrated normal operating positions of relays 1–FA and 1–OA, as shown in FIG. 1B; i.e., relay 1–FA remains dropped away and relay 1–OA remains picked up, as previously described, so that occupancy relay 1–OCC will not be picked up. This failure of the vehicle V to berth properly is thus registered by relay W–VBF which will now be energized by a circuit extending from (+), through back contact 28 of relay 1TP, front contact 29 of check relay 2–CH, back contact 48 of occupancy relay 1–OCC, front contact 49 of check relay 1–CH, and to (−). This then causes the FAILURE indicating lamp of the Wayside Indicator to be illuminated through front contact 50 of relay W–VBF.

In addition to providing the above wayside indication that the vehicle V has stopped short of its proper berthing space, the failure of relay W–VBP to be picked up prevents application of the 120 door control code rate to wayside loop circuits 1L and 2L (front contact 42 of relay W–VBP does not close) and the door of the vehicle will not be operated. The maintenance personnel at the wayside station WS would then correct the system difficulties in order to continue automatic control of the vehicle V.

*Vehicle overruns desired stopping location*

On the other hand, the vehicle may overrun its desired berthing space at station WS, so that it is positioned to reflect the energy transmitted by both transmitting units R1 and R2. Under such conditions, object absent relays 1–OA and 2–OA are both released while floor absent relays 1–FA and 2–FA are both picked up. Occupancy relay 1–OCC will thus be energized through the previously described pick up circuit including front contact 21 of relay 1–FA and back contact 22 of relay 1–OA, and furthermore, occupancy relay 2–OCC will also be picked up over front contact 51 of relay 2–FA and back contact 52 of relay 2–OA. With occupancy relay 2–OCC thus picked up, relay W–VBF is now energized by a circuit extending from (+), through back contact 28 of relay 1TP, front contact 29 of relay 2–CH, front contact 53 of relay 1–OCC, front contact 54 of relay 2–OCC, front contact 49 of relay 1–CH, and to (−). Here again the FAILURE indicator lamp of the Wayside Indicator, of FIG. 1B, is lit to indicate that the vehicle V has failed to berth properly and the 120 door control code rate is not applied to the wayside loop circuit 1L and 2L.

To further discuss the operation of the illustrated embodiment, it will now be assumed that the vehicle V has been spotted properly at wayside station WS and that the doors of the vehicle have been opened, as previously described, to allow passengers to disembark at station WS and permit other passengers to enter the vehicle V for its return trip to the opposite wayside terminal station ES (not shown).

Referring now to FIG. 1A, it will be noted that the application of this 120 door control code rate to wayside loop circuits 1L and 2L continues until the direction registration delay DIR is oppositely positioned to open is front or west bound contact 38. However, the direction registration relay DIR cannot be oppositely positioned to close its back or eastbound contacts until a predetermined minimum time interval has elapsed, as dictated by the timing characteristics of the motor driven timer W–TE and the slow drop away relay W–120A.

Assuming now that motor driven timer W–TE has completed its timing operation and closes its front contact 37, the repeater relay W–TEP is now picked up, through the obvious circuit, to open the energizing circuit for relay W–120A at back contact 55 of relay W–TEP. After the drop away time has elapsed for relay W–120A, the direction registration relay DIR may be oppositely positioned to close its back or eastbound traffic contacts, as soon as the programmer PR actuates programming switch PS to its right-hand or eastbound position E. More specifically, direction registration relay DIR can then be energized by a circuit extending from (+), through back contact 56 of relay W–120A, front contact 57 of relay W–TEP, eastbound contact 58 of programmer switch PS, and to (−). As mentioned previously, direction registration relay DIR is a magnetic stick type relay which would then remain in its eastbound position even though the energization to its winding is removed. It should furthermore be pointed out, at this time, that the designation YY in the energizing circuit for direction registration relay DIR refers various conditions, well known to those skilled in the art, that normally would be met before a change in the condition of relay DIR is obtained, for example, a checking of certain track relays to make sure that the stretch of track is clear for the return trip of the vehicle to station ES (not shown).

With the direction registration relay DIR now operated to its eastbound traffic condition, the 120 code rate is removed from wayside loop circuit 1L and 2L, by the opening of front contact 38, to cause the doors of the vehicle V to be automatically closed and locked, and subsequently, a 270 code rate is applied, via back or eastbound contact 59 of relay DIR, to the right-hand or east end of track section 2T, to get the vehicle V underway for its return trip to the eastbound terminal station ES (not shown).

Having thus described one specific embodiment of the present invention, it will be noted that a vehicle detection and control system has been provided by this invention which detects and indicates the actual stopping position of a vehicle relative to a predetermined desired stopping location, and which furthermore renders subsequent control of the vehicle dependent upon this detection of the vehicle stopping position. It is to be understood that this form is selected to facilitate in the disclosure of the invention rather than to limit the number of forms which it may assume, and it is to be further understood that various modifications, adaptations and alterations may be applied to the specific form shown, to meet the requirements of practice, without in any manner departing from the spirit or scope of the present invention.

What I claim is:

1. A control system for controlling the operation of the doors of a vehicle dependent upon the stopping position of the vehicle relative to a desired stopping location having predetermined limits comprising, wayside transmitting means for transmitting energy across the path of said vehicle at the predetermined limits of said desired stopping location, wayside receiving means at the predetermined limits of said desired stopping location effective to receive said transmitted energy when reflected by said vehicle, wayside registering means responsive to the condition of said receiving means for registering whether or not said vehicle has stopped within the predetermined limits of said desired stopping location, and communication means partly on the wayside and partly on the vehicle responsive to the registration of said wayside registering means for communicating a door opening control to the vehicle only when said vehicle has properly stopped within the predetermined limits of said desired stopping location.

2. A control system according to claim 1 including indicating means responsive to the registration of said wayside registering means for indicating whether or not said vehicle has stopped within the predetermined limits of said desired stopping location.

3. A control system for remotely controlling a vehicle from the wayside dependent upon the stopping position of the vehicle relative to a desired stopping location having predetermined limits comprising, wayside transmitting means for transmitting energy across the path of said vehicle at each of the predetermined limits of said desired stopping location, wayside receiving means at each of the predetermined limits of said desired stopping location effective to receive said transmitted energy when reflected by said vehicle, wayside registering means responsive to the condition of said receiving means at each of said predetermined limits for registering whether or not said vehicle has stopped within the predetermined limits of said desired stopping location, and code communication means partly on the wayside and partly on said vehicle selectively rendered effective and ineffective to communicate coded vehicle control information from the wayside to said vehicle in accordance with the registration of said wayside registering means.

4. In a stopping position detecting system for a right of way location having predetermined beginning and ending limits between which a vehicle is desired to stop, first energy transmitting means mounted above said right of way at the beginning limit of said desired stopping location for transmitting energy across the path of the vehicle and onto the surface of said right of way, first energy receiving means mounted above said right of way at the beginning limit of said desired stopping location for receiving energy transmitted by said first energy transmitting means when said transmitted energy is reflected from either the surface of said right of way or said vehicle, second energy transmitting means mounted above said right of way at the ending limit of said desired stopping location for transmitting energy across the path of said vehicle and onto the surface of said right of way, second energy receiving means mounted above said right of way at the ending limit of said desired stopping location for receiving energy transmitted by said second energy transmitting means when said transmitted energy is reflected from either the surface of said right of way or said vehicle, and registering means responsive to the condition of said first and second energy receiving means for registering that the vehicle has properly stopped at said desired stopping location when only said first receiving means is receiving energy reflected from said stopped vehicle.

5. A control system for controlling the operation of a vehicle carried door dependent uopn the stopping position of the vehicle relative to a predetermined desired stopping location on a right of way comprising, wayside registering means for registering the stopping position of said vehicle relative to said desired stopping location, and communication means partly on the vehicle and partly on the wayside and including wayside loop circuit means selectively energized to communicate a door opening control to said vehicle dependent upon the registration of said wayside registering means and only provided that said vehicle has stopped at said desired stopping location.

6. In a system for controlling an automated vehicle on a right of way, said vehicle being equipped with control apparatus for automatically operating the vehicle in response to predetermined command information supplied to said control apparatus indicative of the desired operation of said vehicle, the combination of, (a) means responsive to the presence of said vehicle at the approach to a predetermined desired vehicle stopping location for causing a stop command to be supplied to said control means effective to initiate a stopping of said vehicle, (b) registering means responsive to the stopping of said vehicle effective to register whether or not said vehicle stops properly at said desired stopping location, said registering means including energy transmitting means effective to transmit energy between the wayside and said vehicle, said energy being distinctively reflected dependent upon whether or not said vehicle is stopped at said desired stopping location, and energy receiving means effective to receive said distinctively reflected energy, (c) means responsive to said energy receiving means of registering means effective to permit supplying of subsequent command information to said control apparatus only provided that said vehicle has stopped properly at said desired stopping location.

7. The combination specified in claim 6 wherein said energy transmitting means is on the wayside for transmitting energy across the path of said vehicle adjacent said desired stopping location and wherein said receiving means is also on the wayside effective to receive said transmitted energy when reflected by said vehicle.

8. A control system for controlling a vehicle dependent upon the stopping position of the vehicle relative to a desired stopping location on a right of way, said desired stopping location having predetermined beginning and ending limits defined respectively by first and second spaced wayside points, and at which said vehicle is desired to stop with a selected end of said vehicle between said spaced wayside points, comprising, detecting means disposed on the wayside substantially at each of said spaced points responsive to the presence of said vehicle effective to detect whether or not said vehicle stops properly within the predetermined limits of said desired stopping location by detecting that said selected one end of said vehicle has passed beyond said first wayside point but has stopped short of said second wayside point, and control means responsive to said detecting means rendered effective to subsequently control the vehicle after stopping only provided that said vehicle has stopped with said selected end between said spaced wayside points and rendered ineffective to subsequently control the vehicle if said selected end either fails to pass said first wayside point or said selected end passes said second wayside point.

9. The system according to claim 8 wherein said selected end of said vehicle is the leading end of said vehicle when approaching said desired stopping location, and wherein said detecting means is effective to detect that said vehicle is properly stopped at said desired stopping location when the leading end of said vehicle when stopped is beyond said first wayside point so as to have actuated the detecting means at said first wayside point but has stopped short of said second wayside point so as to not actuate the detecting means at said second wayside point.

10. A control system for controlling a vehicle dependent upon the stopping position of the vehicle relative to a desired stopping location having predetermined beginning and ending limits defined respectively by first and second spaced wayside points and at which said vehicle is desired to stop with a selected end of said vehicle between said spaced wayside points, comprising, wayside transmitting means for transmitting energy across the path of said vehicle at each of said first and second spaced wayside points, registering means effective to register whether or not said vehicle stops properly with said selected end between said spaced wayside points by detecting whether or not the energy being transmitting at the respective spaced wayside points is impinging upon the vehicle when stopped, and control means responsive to said registering means rendered effective to control the vehicle subsequent to stopping if said selected vehicle end stops between said spaced wayside points and rendered ineffective to control the vehicle subsequent to stopping if said selected end either stops short of said first wayside point or passes beyond said second wayside point.

(References on following page)

References Cited by the Examiner

UNITED STATES PATENTS

| | | | |
|---|---|---|---|
| 1,768,360 | 6/1930 | Jenney | 214—16.18 |
| 1,982,341 | 11/1934 | Hitchcock | 340—258 |
| 2,288,763 | 7/1942 | Winship et al. | 214—41 |
| 2,510,066 | 6/1950 | Busignies | 246—8 X |
| 2,649,538 | 8/1953 | Marlowe et al. | 340—258 |
| 2,690,236 | 9/1954 | Hancock et al. | 187—29 |
| 2,753,550 | 7/1956 | Treharne. | |
| 2,826,995 | 3/1958 | Mishelevich et al. | 246—29 X |
| 2,827,983 | 3/1958 | Lowe | 187—61 |
| 3,017,622 | 1/1962 | Horsfall | 340—258 X |
| 3,039,176 | 6/1962 | Descheues et al. | 104—88 X |
| 3,042,899 | 7/1962 | Kendall et al. | 340—259 |
| 3,063,170 | 11/1962 | Auer | 340—258 X |
| 3,114,128 | 12/1963 | Ljungman et al. | 340—258 X |

ARTHUR L. LA POINT, *Primary Examiner.*

JAMES S. SHANK, LEO QUACKENBUSH, *Examiners.*

S. B. GREEN, *Assistant Examiner.*